(12) United States Patent
Chandra et al.

(10) Patent No.: US 10,296,061 B2
(45) Date of Patent: May 21, 2019

(54) RECONFIGURABLE AND SCALABLE HARDWARE MANAGEMENT ARCHITECTURE

(71) Applicant: Lattice Semiconductor Corporation, Hillsboro, OR (US)

(72) Inventors: Srirama Chandra, Beaverton, OR (US); Robert Bartel, Beaverton, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 626 days.

(21) Appl. No.: 14/576,348

(22) Filed: Dec. 19, 2014

(65) Prior Publication Data
US 2016/0179071 A1    Jun. 23, 2016

(51) Int. Cl.
  *G06F 1/20*  (2006.01)
  *G06F 1/24*  (2006.01)
  *G06F 1/28*  (2006.01)
  *G06F 1/26*  (2006.01)

(52) U.S. Cl.
  CPC ............... *G06F 1/26* (2013.01); *G06F 1/206* (2013.01); *G06F 1/24* (2013.01); *G06F 1/28* (2013.01)

(58) Field of Classification Search
  CPC ... G06F 1/206; G06F 1/24; G06F 1/26; G06F 1/28
  USPC .......................................................... 710/2
  See application file for complete search history.

(56) References Cited

U.S. PATENT DOCUMENTS

| 5,727,184 | A | * | 3/1998 | Richter | ................. G06F 13/385 710/305 |
|---|---|---|---|---|---|
| 6,735,706 | B2 | | 5/2004 | Tomlinson et al. | |
| 7,100,058 | B1 | | 8/2006 | Tomlinson et al. | |
| 7,170,315 | B2 | | 1/2007 | Bakker et al. | |
| 7,414,427 | B1 | * | 8/2008 | Bakker | ................. H03K 17/687 326/32 |
| 2001/0015918 | A1 | * | 8/2001 | Bhatnagar | .......... G05B 19/0423 365/200 |
| 2005/0242836 | A1 | * | 11/2005 | Goetting | ............ G01R 31/3167 326/39 |
| 2008/0112214 | A1 | * | 5/2008 | Chung | ................... B82Y 25/00 365/158 |

(Continued)

*Primary Examiner* — Benjamin P Geib
*Assistant Examiner* — Getente A Yimer
(74) *Attorney, Agent, or Firm* — Haynes and Boone, LLP

(57) ABSTRACT

In one embodiment, a reconfigurable and scalable hardware management architecture includes a digital controller for controlling two or more analog sense-and-control (ASC) circuits, where each ASC monitors voltage, current, and temperature of one or more power supplies (e.g., DC-to-DC converters), ICs, or a circuit board. The controller and ASCs are connected in a star architecture, where each ASC is connected to the controller via a different, dedicated interface to communicate regarding the power supplies being monitored. In addition, the controller and the ASCs are also connected in a bus architecture via a shared interface. The architecture can be re-configured by adding one or more additional ASCs or by removing one or more existing ASCs, where each additional ASC is (i) connected to a different I/O interface of the digital controller via a different, dedicated interface and (ii) connected to the digital controller and the two or more existing ASCs via the shared interface.

18 Claims, 2 Drawing Sheets

(56) References Cited

U.S. PATENT DOCUMENTS

2010/0199014 A1* 8/2010 Guido .................... F02D 41/26
                                                      710/306
2010/0219790 A1* 9/2010 Chadbourne ........... G06F 1/266
                                                      320/107

* cited by examiner

100

RECONFIGURABLE AND SCALABLE HARDWARE MANAGEMENT ARCHITECTURE

BACKGROUND

Field of the Invention

The present invention relates to electronics and, more specifically but not exclusively, to architectures for monitoring power or other characteristics in electronic systems.

Description of the Related Art

This section introduces aspects that may help facilitate a better understanding of the invention. Accordingly, the statements of this section are to be read in this light and are not to be understood as admissions about what is prior art or what is not prior art.

Electronic systems, such as printed circuit boards (PCBs), need power. The components in an electronic system can have multiple, different operating voltages. Furthermore, the power-up and/or power-down sequences can be important to avoid component damage when turning on and off electronic systems. Because of these issues, many electronic systems of even modest complexity are not instant on; instead, power is sequenced and controlled by a power management subsystem. Typically, the boards use thermal management ICs to monitor operating temperature of large devices on the board and control temperature using chip-mounted fans. In addition, digital components may also have digital control functions such as reset functions, system interfaces, JTAG controllers, and watchdog timers. Power management functions, thermal management functions, and digital control functions are collectively referred to as hardware management functions.

Many electronic systems utilize "point of load" (POL) converters. These are mainly small, integrated DC-to-DC down converters. POL converters have an enable pin to turn power on. Power distribution is typically implemented at higher voltages and then converted to lower voltages near low-voltage components to avoid I*R losses. In some cases (e.g., in some battery-powered systems), voltage can also be increased as necessary. Some applications use the same voltage rails to more than one chip. Under such conditions, only one instance of the DC-to-DC converter is typically used, and MOSFETs are then used to feed the same rail to all devices and meet their sequencing requirements. Other applications may use a linear regulator in place of either the MOSFET or POL converter.

Larger system boards can have many power supply domains and many POL converters. Parts on the board can have varying requirements for which power supplies need to be powered up or down in particular orders. Also monitoring is important for reliable reset generation. Moreover, the need for dynamic power management is becoming popular to control the heat dissipated by a given device. As an example, processor speed may be reduced if temperature gets too high or if the processor is drawing too much current. More popularly, processor speed is increased when needed, but that requires voltage changes before clock changes which must be monitored; otherwise, failures occur. Lower power is accomplished by reducing the clock speed (which is proportional to power) and reducing power supply voltage. It is also true that, if more performance is desired and temperature is acceptable, power supply voltage can be increased and clock speed increased. Clock changes are determined by the monitored temperature and system needs. Power supply voltage and current (power) is monitored as well to ensure that the system is operating within design margins. This includes modifying monitoring limits if the power supply voltage is adjusted in the system. Board power supply systems typically monitor voltage, current, and temperature. Finally, capturing conditions when a fault occurs, known as fault logging, is becoming a critical requirement of systems. Logging the voltage, current, and temperature conditions if a fault or an out-of-spec condition is detected is becoming commonplace and is frequently essential to system debug.

As a result, both simple boards (e.g., having fewer power supplies) and complex boards (e.g., having more power supplies) may require tightly integrated thermal and control paths, power supply monitoring, sequencing, and general control. Standard off-the-shelf power management IC's require that enable pins be partitioned across multiple devices if one device does not have the resources to perform the complete power management function of the board. This further complicates power management designs. In many cases, pin limitations force design tradeoffs that reduce board reliability. Another conventional approach is to design a different specific solution for each different system, but that can be both costly and time consuming. Another approach is to design a single integrated component that can handle all or at least most applications. Such an approach is wasteful and inefficient for relatively simple applications.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 1:
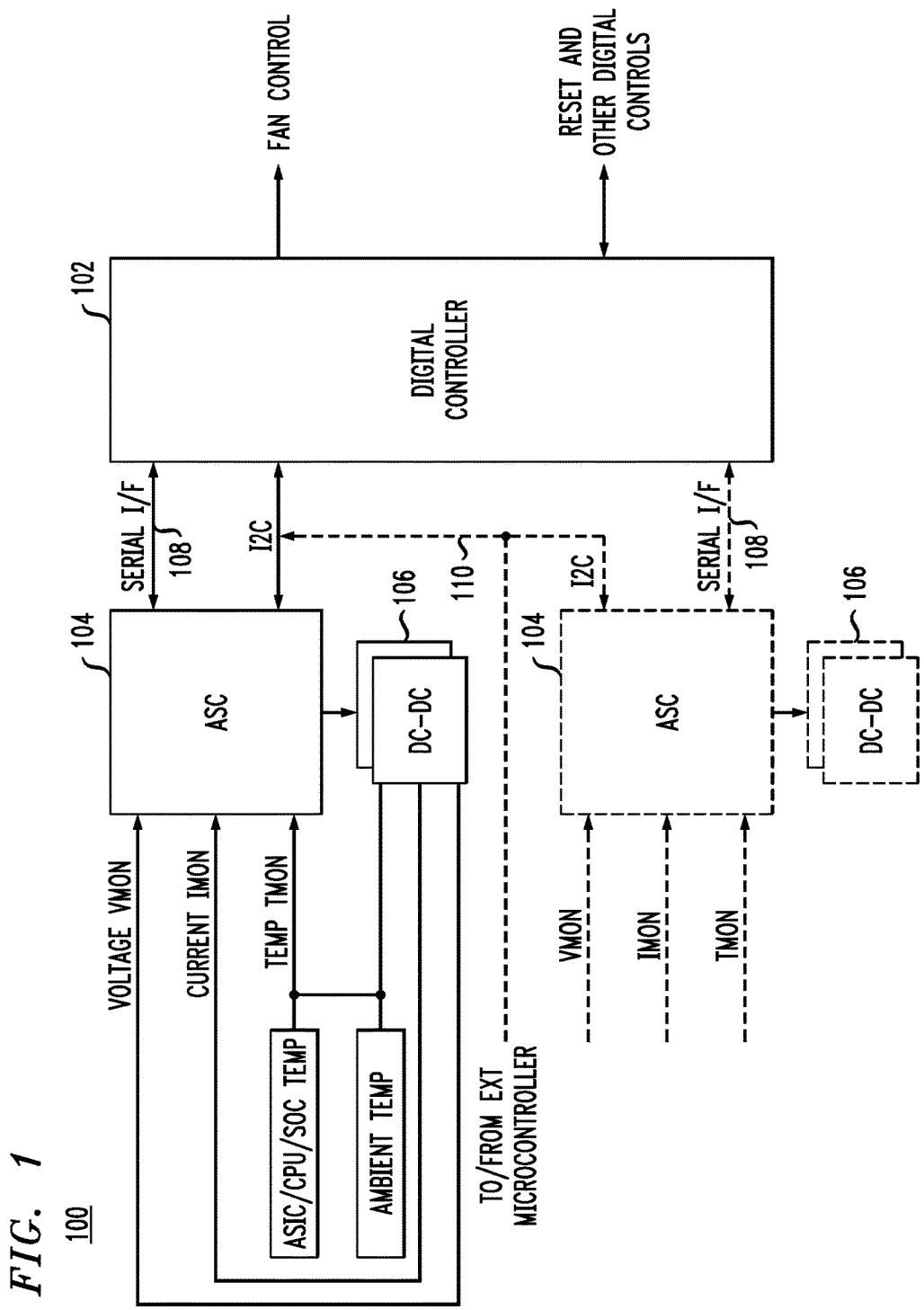
FIG. 1 is simplified block diagram of a reconfigurable and scalable hardware management architecture for an electronic system.

FIG. 1 is simplified block diagram of a reconfigurable and scalable power management architecture 100 for an electronic system, such as a printed circuit board, having other components (not shown) that require multiple, different power supply voltages. Architecture 100 comprises a digital controller 102 that controls the operations of one or more analog sense chips (ASCs) 104, each of which is configured to sense voltage, current, and temperature characteristics of one or more power supplies 106 (e.g., DC-to-DC "point of load" converters, power MOSFETs or bipolars, or linear regulators) that collectively generate the multiple, different power supply voltages for the electronic system. In addition to monitoring analog characteristics, each ASC 104 controls power up and power down of its associated power supplies, either through digital enables on the power supplies or with a special circuit to control power MOSFETs as switches. In addition, each ASC has a feature to implement fine control of the associated power supply voltages. Digital controller 102 is a single logical device, such as an FPGA, that controls all of the ASCs in the system independent of the number of ASCs in the system. Board-specific hardware management algorithm is centrally located in the digital controller 102.

As shown in FIG. 1, each ASC 104 communicates with controller 102 via its own dedicated (e.g., serial) interface 108 in a star configuration In addition, controller 102 programs/configures all of the ASCs 104 via a shared interface 110, such as an I2C (inter-integrated circuit) bus, in a bus configuration. The shared interface 110 can also provide external sub-system access to and from architecture 100, for example, with respect to a system-level (micro) controller (not shown) used to perform telemetry functions, configure ASCs 104 and digital controller 102, and control the operations of hardware management architecture 100. Alternatively, a secondary bus (not shown) could be provided to support communication between digital controller 102 and an external system controller. This can have advantages for 120 bus loading and addressing on busy serial busses.

Each ASC 104 receives voltage, current, and temperature information from each of its associated DC-to-DC converters 106 in order to monitor and control (e.g., power up and power down of) the power operations of those converters, while controller 102 provides power control for the electronic system of which architecture 100 is a part. Each tightly coupled, high-speed, dedicated interface 108 provides real-time, non-interruptible, and fast transfer of control data between controller 102 and the corresponding ASC 104, thereby avoiding "round robin" and other types of delays associated with shared data busses.

Controller 102 and all ASCs 104 run off of one common clock to provide synchronous timing between those components, thereby allowing deterministic actions throughout architecture 100. For example, each dedicated interface 108 may be a so-called "three-wire" interface that supports clock distribution in addition to incoming and outgoing data transfer and which is described in U.S. patent application Ser. No. 14/043,920, filed on Oct. 2, 2013, the teachings of which are incorporated herein by reference. In certain implementations, controller 102 generates and distributes synchronous clock signals having the same frequency for all of the ASCs 104 through the "three-wire" interface's clock function to allow each ASC 104 to be synchronous to controller 102. An input clock can come from a mandatory ASC or from an external source and be applied to an FPGA, which implements controller 102 and generates all ASC clocks. A mandatory ASC is one that is required for system operation. If communication between controller 102 and a mandatory ASC is lost, then the system will shut down. On the other hand, failure to communicate with an optional ASC will be recognized by controller 102, but system operation will nevertheless continue.

Information transferred across each dedicated interface 108 can include status, alarms, measurements, configuration and control settings, and digital input or output values. Information received by controller 102 via each interface 108 is sent to a digital control block (not shown) within the controller, which makes decisions and controls the overall architecture. Information can be transferred in both directions continuously, and state machines in the controller's digital logic can receive and respond to the information immediately after transfer. Each ASC 104 also receives information from controller 102 through its corresponding interface 108. An external controller can also provide information or receive information from each ASC 104 or controller 102 through shared interface 110. Controller 102 may be considered as a master device and each ASC 104 as a slave device. The external controller can have some ability to modify alarms, configuration, and control setting both through controller 102, but also directly to each ASC 104.

Watchdog timing and both power and reset sequencing control are run from controller 102. The integration of all analog functions on the ASCs 104 allows high accuracy, small board space, and low cost. Response speed is deterministic and fast, not being burdened by microprocessor overhead and interrupts.

Scalability is accomplished by modifying the size of controller 102 and/or the number and/or type of ASCs 104. digital controller 102 may be implemented in an FPGA or other suitable device. Soft IP (e.g., Verilog or VHDL (VHSIC Hardware Description Language)) code is easily transportable between differently sized FPGAs that share a common architecture. If more look-up tables (LUTs) are needed, then a larger FPGA with more LUTs can be used. Similarly, if more input/output (I/O) ports are needed, then an FPGA with more I/O ports can be used. The user then has the flexibility of choosing digital controllers based on I/O or LUT needs. Resets, three-wire interfaces, interrupts, and other digital controls all come out the pool of the generic I/O resources. If an application runs out of resources, then the user can switch to a larger part. If more power supply rails are needed, then one or more additional ASCs can be added. A typical ASC can support up to 10 different rails, although ASCs that support more or fewer rails are also possible to provide a fully flexible monitoring and sequencing solution.

Scalability for digital control and I/O can handle a wide range of needs with Verilog or VHDL code being transportable between differently sized digital controllers.

For analog measurement and monitor functions, there is a base, single-ASC level of resources. If more resources are needed, then one or more additional ASCs 104 can be added. Digital controller 102 supports code that transparently hooks each ASC 104 through a dedicated (e.g., serial) interface 108 to the controller and have digital data available for use with easy access. Each ASC 104 behaves the same in regards to data transmission and reception.

Fault logging happens quickly and deterministically. Logging of data from multiple ASC chips 104 does not affect the logging time. This is a result of the synchronous interface, which captures data from all ASC's simultaneously, and a single digital controller, which initiates the fault log event.

Because all ASCs 104 can be treated the same and run at the same rate, and the hardware management algorithm implemented within a single controller 102 can concurrently see all the status and alarms from all ASCs and control any number of outputs across any number of ASCs simultaneously, there is no need for partitioning the algorithm to expand the hardware management function beyond the pin resources of one ASC. That is, the I/O pins of the controller and the I/O, VMON, IMON, and TMON pins of the multiple ASCs appear to the hardware management algorithm implemented in the controller as the pins of a single cohesive logical device.

Architecture 100 with controller 102 and one or more ASCs 104 can be used as a standard solution across simple to complex boards because particular implementations will use the same types of components, i.e., some appropriately sized FPGA for controller 102 and some appropriate number of ASCs 104. In this way, many board sizes are accommodated, and much of the code and even layouts can be reused from application to application.

Architecture 100 may be implemented as a card-based system where boards can be hot inserted or removed, with controller 102 residing in the system cabinet and ASCs 104 controlling power on individual cards. The hardware management algorithm can detect and react to individual card insertion and extraction without affecting the functionality of other boards in the system. Architecture 100 can also be used to manage boards with varied number of mezzanine cards in the same way.

The star topology of architecture 100 allows each ASC 104 to have the same communication latency and timing in regards to all other ASCs 104 in architecture 100. Since no interface 108 is shared between ASCs 104, data transfer is not slowed down with the inclusion of additional ASCs. This approach enables seamless scaling of functions depending on the board complexity.

As compared to a bus-based topology, the star topology of architecture 100 gives better performance, since all signals do not necessarily get transmitted to all ASCs 104. A sent signal reaches the intended destination directly. Performance of the architecture is independent of the capacity of the controller 102, which is a relatively cheaply and easily scaled digital device, such as an FPGA.

It is easy to connect new ASCs 104. In a star topology, new ASC chips can be added easily without affecting the rest of the architecture. Similarly, ASCs can also be removed easily. Primary detection of whether an ASC chip is in the architecture is accomplished via the controller's I/O interface for the corresponding three-wire interface 108. If the controller's I/O interface receives communications on the three-wire interface from an ASC chip, then the controller knows that the ASC chip is there. If no information is received or if the information is corrupted, then the output state of the three-wire interface to the digital controller is held in reset until clean information is received. The control logic can be designed to respond to this state for an optional part by not causing a fault condition if the three-wire interface is in reset. The controller monitors and waits until it sees communication. Additionally, each ASC chip has a unique address that differentiates the chip and the chip configuration from other ASC chips in the star topology. With the three-wire interface, star topology, and system logic, the system can easily be expanded or contracted even when in operation. The system can then respond accordingly depending on whether the ASC is mandatory or optional.

Failure of one ASC chip does not need to affect the rest of architecture 100. At the same time, it is easy to detect, troubleshoot, and respond to a failure. This is a result of the star topology and the ability in some implementations to sense and control separate resets for each analog ASC chip. In addition, the "three-wire" communication interface 108 has a known state for a "missing" chip.

A user can use the digital controller 102 and discrete interfaces per ASC 104 to implement an interface 108 where an ASC chip can be optional. This is useful in systems that are made up of multiple printed circuit boards that can be added and removed while system operation continues. The add-on modules would be optional to the system. The system detects the presence of chips using the custom "three-wire" serial interface 108 and responds if they are present and ignores those interfaces if not. No automatic system reset would need to occur if such optional modules are not available. Both the controller 102 and the ASCs 104 can initiate a system reset if certain failures are detected.

Both the digital controller and ASC chips store their configurations in non-volatile memory (not shown) for fast startup independent of external control and without needing separate non-volatile memory chips. Configurations are loaded into volatile memory during startup for operation. Each ASC chip has a unique address that is controllable by the user, where the architecture can recognize and write the appropriate configuration data to each ASC chip. The shared serial interface 110 would not know which device it was communicating with unless the device has a unique address. However, to a board manufacturer, all ASC's look exactly the same in package form and it is possible that a board manufacturer could put an ASC with the wrong configuration at a particular board location or even hook in the wrong board. By having a unique address, another level of security is added that the system has the correct components in the correct places.

Architecture 100 can accommodate a single master digital control FPGA 102 and multiple analog sense chips 104. Architecture 100 includes the ability to skip over optional analog sense chips which might or might not be in the system. One example is a rack-mount system where boards can be hot inserted into a rack during continued operation of the system.

Scaling happens due to the varying user requirements when designing circuit boards. Some boards will be relatively simple, and some boards will be relatively complex. Some architectures may even span multiple boards in a rack-mount system where boards may be inserted or removed. The architecture is designed to accommodate and respond appropriately to all of these situations.

Digital scaling occurs by using a bigger (or smaller) FPGA if needed. FPGAs can come in many sizes from small to very large, and the user can determine through configuration software the appropriate size of the FPGA for digital control of the desired application. This is the centralized hardware management algorithm.

In some cases, some amount of the digital control may need to be distributed, and this can be accomplished using multiple peripheral FPGAs connected to the digital control FPGA 102 instead of an ASC. In this case, the FPGA can emulate the "3-wire communication" and enable the digital control FPGA to control signals through the configurable I/O of the different peripheral FPGAs while performing the hardware management function for the system.

Analog functions for power management are voltage, current, and temperature measurements along with higher voltage control enables of power supplies or DC-DC converters and fine adjustable control of power supply voltages. Measurements for a supply would be its output voltage and/or current. Depending on the implementation, the measured temperature can correspond to individual integrated circuits, the printed circuit board, or ambient air. Temperature can be measured using a discrete transistor or other suitable device. Power supply voltage adjustment of a DC-DC converter is done using a digital-to-analog converter (DAC). Each analog sense and control chip 104 implements a certain level of all of the above functions which results in a complete set of resources for analog control functions for power management. For power supplies, this implies being able to monitor voltage, current, and temperature as well as output controls, enables, high voltage switches, and analog DACs. The ASC chip is highly integrated compared to discrete solutions, but the amount of each resource can be kept minimal but optimal to allow scaling. As board complexity rises, additional ASC chips can be added to handle the additional requirements. In this way, power and thermal management analog functions can be scaled to meet the application needs. Different size ASC's or multiple ASC's can be used in an application.

Depending on board requirements, the digital control and analog sense and control needs may vary extensively and will not necessarily track, hence the digital and analog functions can scale separately.

The analog chip(s) 104 can be closer to the board areas they are monitoring and controlling. This reduces significant amounts of long wire traces on boards as well as the possibility of digital and other noise source coupling to analog traces, thereby increasing accuracy due to reduced parasitics. Because the ASC chips are converting the parallel sense and control functions into serial communication, the distributed control system also reduces the PCB routing congestion.

In the case of removable boards in a rack-mount system, there should be at least one analog ASC chip on each board. It would be possible to have them centrally located, but trying to run all the analog sense signals over a digital backplane is very difficult, adds significant parasitic capacitance and resistance, and takes many pins that are needed for digital communication and power. In addition, the digital backplanes can be very noisy. Each custom "three-wire" serial interface 108 functions as a multiplexer for analog sense data and as a demultiplexer for control data.

The analog ASC chips 104 can be sized to give a range of performance, and each ASC chip can have several configurable sensors. As such, the user can select from a range of sizes and features to optimize the solution to the user's hardware and power control needs. Users can use multiple versions of an ASC chip to co-locate the ASC chips near the power and thermal functions that they are controlling.

Many board systems use a microcontroller. A microcontroller has issues in dealing with real-time signaling requirements, but it has many strengths in non-time-critical management of board systems such as telemetry. The proposed solution can exist in this environment, where the I2C interface of the ASC allows a microcontroller to monitor the voltage, current, and temperature status as well as the values of the various analog monitors. Microcontroller control of some features is also allowed. In some implementations, the microcontroller can also provide non-time-critical control to both the ASC and digital controller 102 per needs or as required by the user or application.

Each ASC chip 104 can have a reset pin and can be bidirectional. This allows the controller 102 the ability to monitor and control the reset state of every ASC chip 104. This can be important when using optional ASC chips. For architectures having a certain number of mandatory ASC chips, the reset pins of those mandatory ASC chips can be "ORed" together for connection to a single pin on the controller 102. The reset pin of each optional ASC chip would be connected to a separate reset pin on the digital controller, which can then respond as needed and by user design to a reset for those optional ASC chips. By wire "ORing" all the mandatory ASCs together, pins and board trace wiring can be saved while implementing a system reset on all mandatory devices. Reset between all components is also simultaneous in this method. The system will not start unless all system components allow reset to release. For an optional ASC, this needs to be separate since an optional device may be present or not. It is more foolproof to have separate reset than to try and have the user add extra external circuitry when an optional board is not present.

Figure 2:
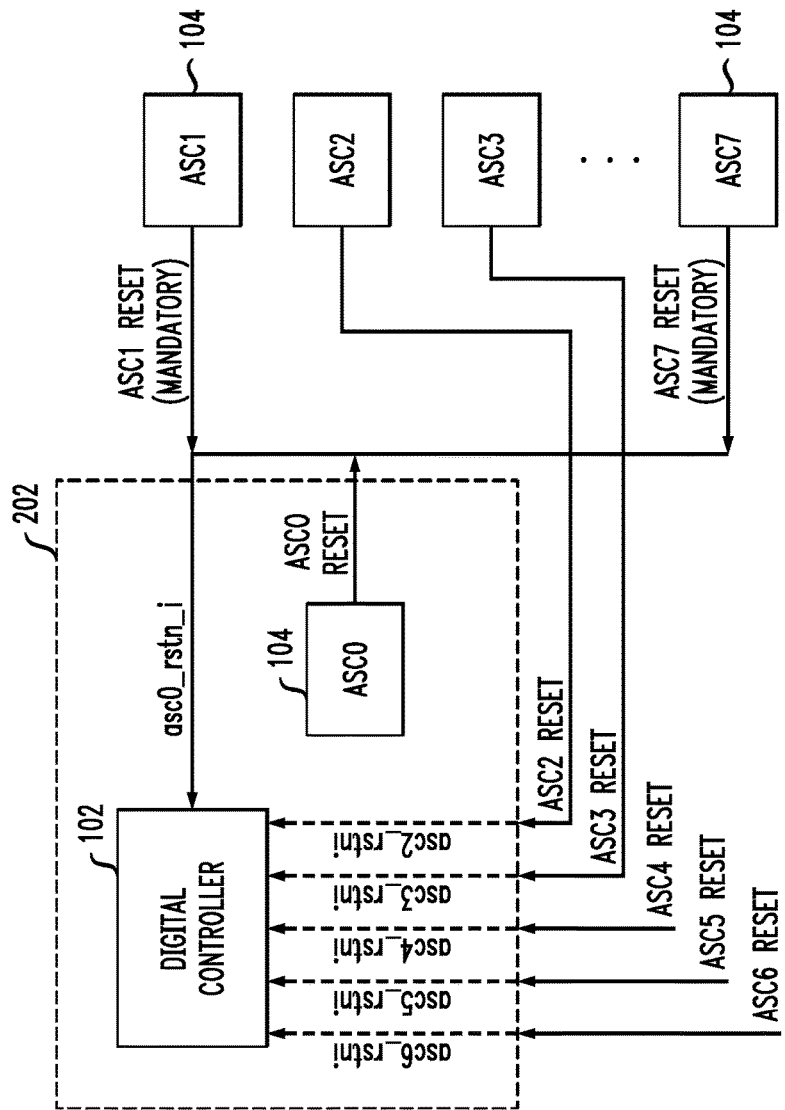
FIG. 2 is simplified block diagram of the reset configuration for one possible implementation of the power management architecture of FIG. 1 for a rack-mount system or a base board with plug-in mezzanine cards.

FIG. 2 is simplified block diagram of the reset configuration for one possible implementation of reconfigurable and scalable power management architecture 100 of FIG. 1 for a rack-mount system or in a base board with multiple mezzanine cards. In this particular implementation, architecture 100 has eight ASCs 104, labeled ASC0-ASC7, where ASC0 is implemented on the same board 202 as digital controller 102, and the other seven ASCs are implemented on seven other boards or mezzanine cards (not shown).

In this implementation of architecture 100, ASC chips ASC0, ASC1, and ASC7 are mandatory chips, while the other five ASC chips ASC2-ASC6 are optional. For example, ASC chips ASC0, ASC1, and ASC7 may be required for the simplest application of architecture 100, while one or more of the other five ASC chips may be optionally included to support more and more complex applications of architecture 100.

In that case, as indicated in FIG. 2, the reset pins for the mandatory ASC chips ASC0, ASC1, and ASC7 can be "ORed" together, for example, externally to board 202. In that way, only one reset port on digital controller 102 needs to be used for those three ASCs, while the other five ASC chips ASC2-ASC6 each have their own dedicated reset connection with a different reset port on digital controller 102. As such, the three mandatory ASC chips ASC0, ASC1, and ASC7 would always be reset at the same time, while the other five ASC chips can be reset independently of each other and independently of the three mandatory ASC chips. Note that digital controller 102 may have additional, unused reset ports that enable architecture 100 to be scaled up to include additional, optional ASC chips (not shown).

For a system that does not have optional interfaces, there are options on how to control the various parts. As described above with reference to FIG. 2, the reset pins of multiple ASCs can be wire "ORed." In this way, a single signal from controller 102 can cause a reset of all of those ASC chips 104 through a single reset pin of the controller. Resets can also be distributed per ASC chip, and reset can be controlled on an individual chip basis based on fault information from the digital control.

In some implementations, controller 102 and all ASCs 104 are distinct chips on one or more PCBs. In other implementations, controller 102 is implemented with one or more ASCs on a single (e.g., FPGA) chip with one or more other ASCs as distinct chips. In either case, one or more additional ASCs 104 can be added to architecture 100 and one or more existing ASCs 104 can be removed from architecture 100 as needed, thereby making architecture 100 both reconfigurable and scalable.

Certain embodiments of the present disclosure provide some or all of the following:

A scalable solution that addresses all types of boards with one design tool so a cost-effective solution can be delivered across a wide range of boards without having to design hardware management of every board separately from the ground up. Reduced time to market by using one design environment. No need for additional learning or relearning depending on solution size;

Accurately supporting the main board function without failure;

Deterministic response to stimuli—voltage, current, temperature, faults, etc.—regardless of the scale of the system;

Independent startup of hardware management system (configures itself since the power system is the first chip on a board to power up). The hardware management system controls the rest of the board power up/down sequencing, monitoring, trimming, and margining (for processors, memory, etc.), distribute reset signals and other digital control functions, and thermally manage the entire board. Preferably a single centralized hardware management algorithm, not partitioned across a number of smaller devices;

Standardization of designs over a range of boards. Keep bill of materials (BOM) as small as possible. BOM should remain small and consistent over the range of products. Reuse of hardware management algorithms;

Designs should be easy to adjust regardless of scale. Ease of modification of designs as necessary. Reuse of designs or portions of designs as much as possible. Easily handles complex sequencing requirements, such as voltage good, wait times, board available or not, hot insertion/removal, different power up/down sequence depending on board condition, trim, and margin, and logical combinations thereof. Changes in sequencing depending on various monitored board conditions or faults;

Fault log speed, accuracy, and control;

More-complex systems generally have a microcontroller monitoring system operation, and the hardware management subsystem may then need to be able to interface to the microcontroller using a serial interface bus; and The target solution should be scalable and as much as possible reusable, while meeting other requirements to be considered as an acceptable solution to hardware management for complex PCB boards.

Although the disclosure has been described in the context of ASCs that monitor voltage, current, and temperature of DC-to-DC converters, in other embodiments, one or more ASCs may monitor other types of analog device and/or other characteristics in addition to or instead of monitoring voltage, current, and temperature of DC-to-DC converters. Other types of analog sense or measurement functions include, for example and without limitation, power, humidity, vibration, light intensity, acceleration, rotation (e.g., fan speed), clock frequency of other components.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A system comprising:
one or more analog sense-and-control (ASC) circuits;
a digital controller comprising a plurality of input/output (I/O) interfaces and connected to control the one or more ASC circuits,
wherein:
each ASC circuit is connected to monitor an analog characteristic of one or more other devices in the system;
each ASC circuit is connected via a different, dedicated, bidirectional interface to a different I/O interface of the digital controller to:
communicate with the digital controller over the interface in a first direction regarding the monitored analog characteristic, and
control the one or more other devices in response to control signals received from the digital controller over the interface in a second direction, wherein the control signals are based at least in part on the monitored analog characteristic communicated to the digital controller;

the system can be re-configured by adding one or more additional ASC circuits or by removing one or more existing ASC circuits, wherein each additional ASC circuit is connected to a different I/O interface of the digital controller via a different, dedicated interface; and the ASC circuits are implemented independently of the digital controller to facilitate reconfiguration of the system by selective addition or selective removal of the ASC circuits.

2. The system of claim 1, wherein each ASC circuit controls power up and power down, output voltage, temperature, and other digital functions of its associated one or more other devices.

3. The system of claim 1, wherein:
the one or more other devices comprise at least one power supply; and
the analog characteristic comprises at least one of a voltage, a current, or a temperature of the at least one power supply or a temperature of an IC or an environment.

4. The system of claim 1, wherein:
each ASC circuit has a reset pin; and
the reset pins of at least two ASC circuits are coupled to a single reset pin for the digital controller.

5. The system of claim 4, wherein the digital controller has one or more additional reset pins, each of which is capable of being connected to the reset pin of a different ASC circuit.

6. The system of claim 1, wherein each dedicated interface is configured to transmit a clock signal from the digital controller to the corresponding ASC circuit, thereby enabling synchronization between the digital controller and at least two ASC circuits.

7. The system of claim 6, wherein the clock signals of the at least two clock signals are synchronous and have the same frequency.

8. The system of claim 1, wherein:
the system is a rack-mount system or a base board with mezzanine cards;
the digital controller is configured in a first printed circuit board (PCB) mounted in a rack of the rack-mount system or located on the base board; and
the one or more ASC circuits are configured in one or more other PCBs that are removably mounted in the rack of the rack-mount system or the base board.

9. The system of claim 1, wherein at least one ASC circuit is configured to be part of the first PCB.

10. The system of claim 1, further comprising the other devices, wherein the digital controller is an FPGA, and wherein at least one of the ASC circuits is configured to monitor a first analog characteristic of its associated one or more other devices and at least one other of the ASC circuits is configured to monitor a second analog characteristic of its associated one or more other devices, and wherein the first analog characteristic is different from the second analog characteristic.

11. The system of claim 1, wherein the digital controller is a single logical device that controls all of the ASC circuits in the system independent of the number of ASC circuits in the system.

12. The system of claim 1, wherein:
the one or more other devices comprise at least one of a power supply or-an IC or a circuit board;
the analog characteristic comprises at least one of a voltage, a current, or a temperature of the power supply or a temperature of the IC or the circuit board;
each dedicated interface is configured to transmit a clock signal from the digital controller to the corresponding ASC circuit, thereby enabling synchronization between the digital controller and at least two ASC circuits; and
the digital controller is an FPGA.

13. The system of claim 1, wherein at least one of the ASC circuits is configured to generate an input clock signal and provide the input clock signal to the digital controller, and wherein the digital controller is configured to generate clock signals for all the ASC circuits of the system based on the input clock signal.

14. The system of claim 1, wherein the digital controller and the one or more ASC circuits are connected via a shared interface, and wherein the shared interface is configured to allow the digital controller to program all the ASC circuits and/or to provide access of the digital controller and the one or more ASC circuits to an external device.

15. A digital controller comprising:
a plurality of input/output (I/O) interfaces configured to be connected to one or more analog sense-and-control (ASC) circuits, wherein:
each ASC circuit is configured to be connected to monitor an analog characteristic of one or more devices, and
each ASC circuit is configured to be connected to the digital controller via a different, dedicated, bidirectional interface to a different one of the I/O interfaces of the digital controller to:
communicate with the digital controller over the interface in a first direction regarding the monitored analog characteristic, and
control the one or more devices in response to control signals received from the digital controller over the interface in a second direction, wherein the control signals are based at least in part on the monitored analog characteristic communicated to the digital controller; and
a processor configured to, for each ASC circuit:
generate a control signal based at least on analog characteristic information received from the ASC circuit via the dedicated interface of the ASC circuit, the analog characteristic information being associated with the analog characteristic of the associated one or more devices of the ASC circuit, and
provide the control signal for transmission to the ASC circuit via the dedicated interface of the ASC circuit to control the ASC circuit,
wherein the ASC circuits are implemented independently of the digital controller to facilitate reconfiguration by selective addition or selective removal of the ASC circuits.

16. The digital controller of claim 15, wherein:
the processor is configured to provide for transmission a clock signal to the ASC circuits via the respective dedicated interfaces to enable synchronization between the digital controller and the ASC circuits; and
the digital controller is an FPGA.

17. A system comprising:
a plurality of analog sense-and-control (ASC) circuits, each ASC circuit comprising:
a dedicated interface configured to connect to an input/output (I/O) interface of a digital controller; and a processor configured to:
- monitor an analog characteristic of one or more devices connected to the ASC circuit,
- communicate, over the dedicated interface in a first direction, information associated with the monitored analog characteristic to the digital controller, and
- control the one or more devices in response to control signals received from the digital controller over the dedicated interface in a second direction, wherein the control signals are based at least in part on the monitored analog characteristic communicated to the digital controller, wherein the ASC circuits are implemented independently of the digital controller to facilitate reconfiguration of the system by selective addition or selective removal of the ASC circuits.

18. The system of claim 17, wherein:
the one or more devices comprise at least one of a power supply or an IC or a circuit board; and
the analog characteristic comprises at least one of a voltage, a current, or a temperature of the at least one power supply or a temperature of the IC or the circuit board.

* * * * *

UNITED STATES PATENT AND TRADEMARK OFFICE
CERTIFICATE OF CORRECTION

PATENT NO.         : 10,296,061 B2
APPLICATION NO.    : 14/576348
DATED              : May 21, 2019
INVENTOR(S)        : Srirama Chandra and Robert Bartel Page 1 of 1

It is certified that error appears in the above-identified patent and that said Letters Patent is hereby corrected as shown below:

In the Specification
In Column 3, Line 13, change "for 120 bus loading" to --for I2C bus loading--

Signed and Sealed this
Twenty-first Day of April, 2020

Andrei Iancu
*Director of the United States Patent and Trademark Office*